United States Patent [19]
Zellner et al.

[11] Patent Number: 6,026,289
[45] Date of Patent: Feb. 15, 2000

[54] SYSTEM AND METHOD FOR WIRELESS BROADCAST ON SHARED CHANNELS

[75] Inventors: Samuel N. Zellner, Dunwoody; Mark Enzmann, Roswell, both of Ga.

[73] Assignee: BellSouth Intellectual Property Corporation, Wilmington, Del.

[21] Appl. No.: 08/902,778

[22] Filed: Jul. 30, 1997

[51] Int. Cl.[7] .................................................. H04M 11/08
[52] U.S. Cl. ............................ 455/403; 455/454; 455/414
[58] Field of Search .................................... 455/403, 416, 455/450, 150.1, 454, 414

[56] References Cited

U.S. PATENT DOCUMENTS

| | | | |
|---|---|---|---|
| 5,131,020 | 7/1992 | Liebesny et al. | 455/414 |
| 5,343,511 | 8/1994 | Osada | 455/414 |
| 5,404,355 | 4/1995 | Raith | 455/414 |
| 5,694,455 | 12/1997 | Goodman | 455/414 |
| 5,761,618 | 6/1998 | Lynch et al. | 455/419 |

FOREIGN PATENT DOCUMENTS 0 752793 A2  8/1997  European Pat. Off. .

OTHER PUBLICATIONS

Article XP000612348 "Voice Processing on the Mobile Network".

*Primary Examiner*—David R. Hudspeth
*Assistant Examiner*—Daniel Abebe
*Attorney, Agent, or Firm*—Jones & Askew, LLP

[57] ABSTRACT

A system and method for providing wireless broadcast on shared channels in a cellular communications system. The system and method in response to a request from a remote user for broadcast service designates a voice channel as a broadcast channel, disables the quality monitoring for the designated broadcast channel, activates the designated broadcast channel, and instructs the requesting remote user to tune to the designated broadcast channel. Each subsequent requesting remote user is also instructed to tune to the same broadcast channel. Similarly, in response to a request from broadcaster, the system and method identifies the remote user to receive the broadcast, designates a voice channel as a broadcast channel, disables the quality monitoring for the designated broadcast channel, activates the designated broadcast channel, and instructs the identified remote users to tune to the designated broadcast channel.

14 Claims, 3 Drawing Sheets

SYSTEM AND METHOD FOR WIRELESS BROADCAST ON SHARED CHANNELS

FIELD OF THE INVENTION

This invention relates in general to a cellular communications system and more particularly to a method for broadcasting information (data) from a broadcaster to multiple users on a shared channel.

BACKGROUND OF THE INVENTION

Cellular communications systems provide remote users a variety of services in addition to voice communications from one remote user to another party. For example, cellular communications systems provide informational audio services, such as traffic reports, weather reports, lottery information, etc. from broadcasters to remote users of the cellular communications system. Cellular communications systems also can broadcast other information (data) to a number of remote users. For example, a broadcaster can use a cellular communications system to send data for a message to a number of remotely located billboards.

In current cellular communications systems informational audio services and broadcast data services are treated just like any other telephone call. Within each cell, a dedicated radio channel is assigned between the broadcaster and each remote user for the duration of the informational audio call or data transmission. The use of a dedicated voice channel for broadcasting information means that the call for broadcast information services rationally must be priced for each remote user the same as any other voice call. Such pricing limits the demand for broadcast information services.

In addition, the need for a separate, dedicated voice channel for each remote user for each broadcast information call restricts the usage of such broadcast information services because of the limited number of channels in each cell. With respect to informational audio calls, such as weather and traffic reports, the problem of limited cell capacity becomes more acute when one considers that the peak cellular telephone usage for voice calls often coincides with workers' commuting time, precisely the time when the demand for informational audio service, such as weather and traffic reports, is also likely to peak. The transfer of data to billboards may also be adversely effected by cell capacity where the broadcaster wishes to update a large number of billboards within a short time period.

SUMMARY OF THE INVENTION

The present invention overcomes the problems outlined above by providing a system and method for delivering broadcast information services from broadcasters to remote users over shared channels in an existing cellular communications system. In the case of informational audio calls initiated by one or more remote users in a particular cell to a broadcaster of an informational audio service, the mobile switch associated with the cellular communications system sets up the calls on a shared broadcast channel in the cell. Likewise, for broadcaster initiated service, the mobile switch sets up the calls to each remote receiver of the broadcast data on a shared broadcast channel.

For a call request initiated by a remote user (e.g. a call for a traffic report) on a control channel within the cell, the mobile switch checks the authorization (validity) of the requesting remote user. After determining that the requesting remote user is an authorized user, the mobile switch ascertains if a broadcast channel is set up for the requested informational audio service (traffic report). If the broadcast channel for the requested informational audio service has not been previously set up, the mobile switch designates a broadcast channel, disables the return signal quality monitoring for that broadcast channel, activates the broadcast channel, and instructs the requesting remote user, via the control channel, to tune to that broadcast channel for receipt of the informational audio service.

If a second remote user requests the same informational audio service on the control channel while the first remote user is connected to the broadcast channel, the mobile switch, after validating the access for the second remote user, instructs the second remote user to tune to the broadcast channel, and both remote users receive the informational audio service (traffic report) simultaneously on the shared broadcast channel.

In the case of a broadcaster initiated call for data transmission to one or more identified remote users (e.g. data to update a number of electronic billboards), the mobile switch may first utilize the control channel to check and condition the status of each of the remote users (billboards). Such checking and conditioning may include waking the remote user from a low power sleep condition, running diagnostic testing on each remote user, and receiving limited return data, etc. Once the remote users have been checked and conditioned to receive the broadcast data, the mobile switch designates a broadcast channel, disables the return signal quality monitoring for that broadcast channel, activates the broadcast channel, and instructs the identified remote users (billboards), via the control channel, to tune to that broadcast channel for receipt of the broadcast data (new billboard message).

By using a single broadcast channel for a number of remote users seeking the same information from a broadcaster (the same traffic report or the same billboard message), the system and method of the present invention minimize the usage of channel capacity in a cell. By sharing a single broadcast channel with a number of remote users, the operator of the cellular communication system can rationally price the broadcast information services lower than standard voice calls and thereby increase utilization of the cellular communications system.

DETAILED DESCRIPTION

Figure 1:
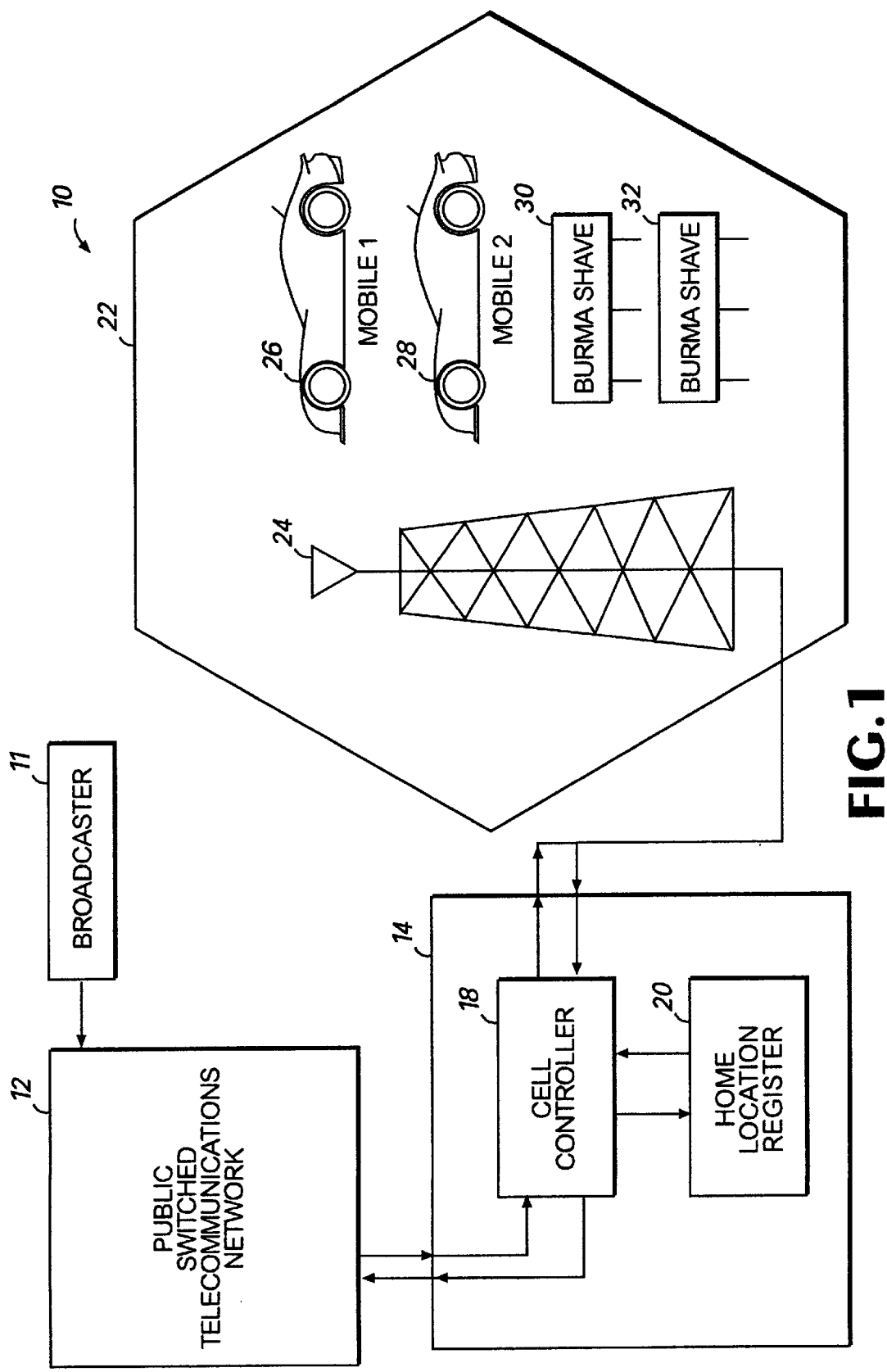
FIG. 1 is block diagram of a cellular communications system which is an environment for the present invention.

One environment for the present invention is an existing cellular communications system. Such cellular communications systems include those constructed and operated in accordance with various well known standards, such a TDMA (IS-54 and IS-136), AMPS (IS-41), NAMPS, GSM, DCS1800, DCS1900, CDMA (IS-95), PACS, TACS, JTACS, and PDC. Turning to the drawings in which like numbers reference like parts or steps, in the several figures, FIG. 1 of this specification is a schematic diagram of a cellular communications system 10 which constitutes an environment for the present invention. The cellular communications system 10 comprises a mobile switch 14 and a number of cells, such as illustrated cell 22. The cellular communications system 10 is connected to the public switched telecommunications system 12 via the mobile switch 14. A broadcaster 11 is connected to the mobile switch via the public switched telecommunications system 12. The broadcaster 11 provides information to remote users including for example traffic reports, weather reports, lottery information, or other data for use by a number of remote users.

Each cell 22 has a transmitter/receiver tower 24 which transmits data to and receives data from remote users 26, 28, 30, and 32. Each cell has a limited number of channels on which data can be transmitted and received. For the purposes of illustration, remote users 26 and 28 are automobile based telephone users, and remote users 30 and 32 are electronic billboards. The remote users may, however, include a variety of devices, such as hand held telephones, facsimile machines, computers, telemetry devices, and control devices, among others.

The mobile switch 14 comprises a cell controller 18 and a home location register (HLR) 20. The cell controller 18 is a high speed digital computer that is programmed to control the functions required of the mobile switch 14 in the cellular communications system 10. The HLR 20 is a memory device capable of storing a database under control of the cell controller 18. The database in the HLR 20 contains profile and authorization information about each of the remote users of the cellular communications system 10. The profile and authorization information for each remote user is input into the HLR 20 at the time when each remote user subscribes to the service of the cellular communications system 10.

The cellular communications system 10, provides informational audio services and data transmission services (collectively broadcast information services) to remote users in each cell. Such broadcast information services are conventional provided to the remote users 26, 28, 30, and 32 by the broadcaster 11 via the public switched telephone network 12 and the mobile switch 14. Conventionally, calls for informational audio services (e.g. traffic report) begin with a request from one of the remote users such as remote users 26 and 28. The call request for the informational audio service is then set up just like a standard voice call with the requesting remote user connect to the broadcaster 11 of the informational audio service exclusively for the duration of the call. Likewise, data transmission services from the broadcaster 11 to the remote users 30 and 32 are conventionally initiated by a series of calls from the broadcaster 11 to the remote users 30 and 32 via the public switched telephone network 12 and the mobile switch 14. Each call to each remote user is on a dedicated channel of the cell 22.

Figure 2:
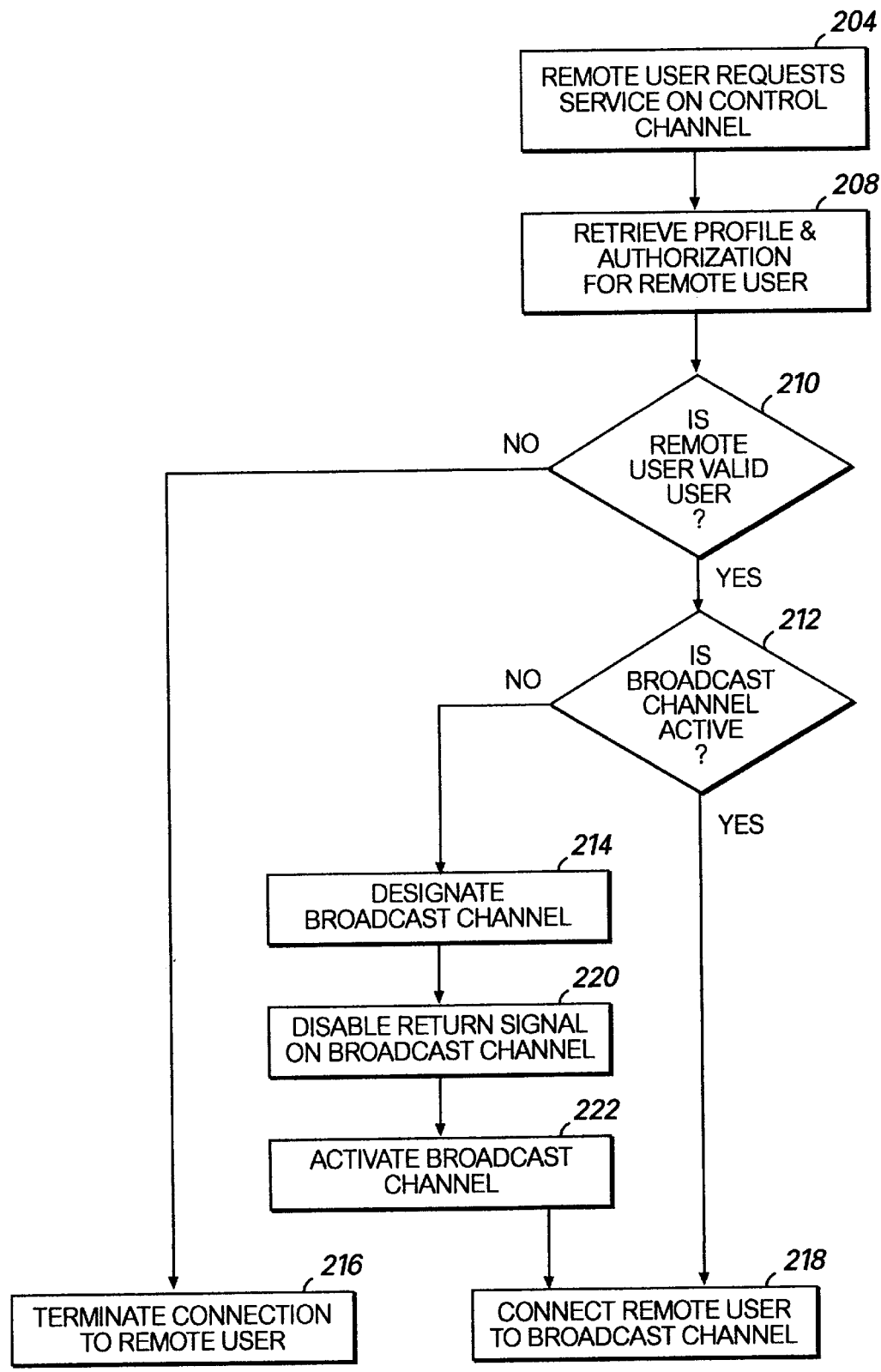
FIG. 2 is a flow diagram illustrating the method of handling requests for broadcast information service initiated by a remote user in accordance with the present invention.
Figure 3:
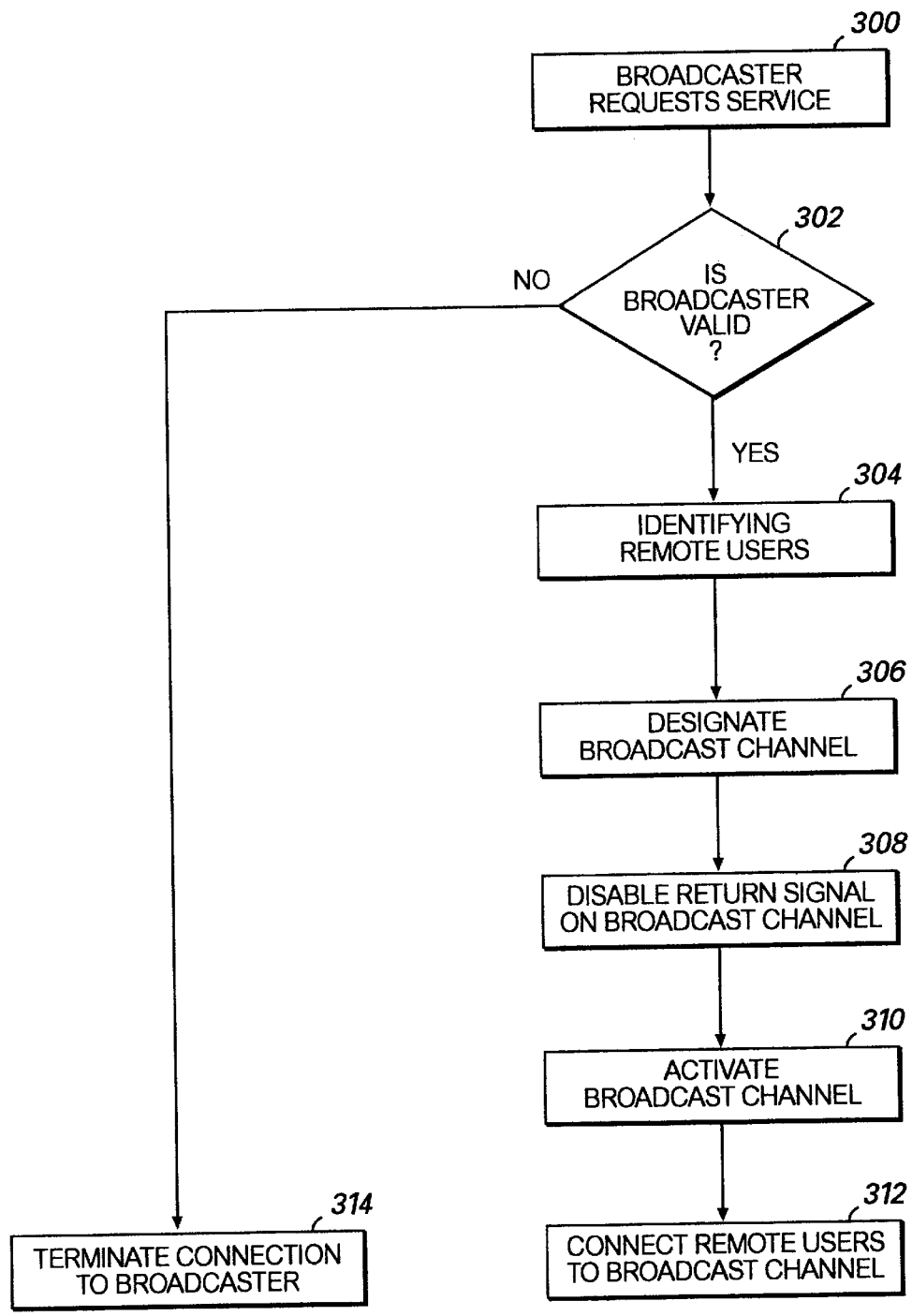
FIG. 3 is a flow diagram illustrating the method of handling requests for broadcast information service initiated by a broadcaster in accordance with the present invention.

In accordance with the present invention, the method for providing broadcast information services on a shared channel is illustrated in FIGS. 2 and 3. FIG. 2 illustrates the method where the remote user initiates the call request for broadcast information service, and FIG. 3 illustrates the method where the broadcaster 11 initiates the call request to provide broadcast information service.

Particularly, FIG. 2 illustrates the method of the present invention where the call request for broadcast information service is initiated by one of the remote users 26 and 28, and the broadcast information is delivered to the requesting remote user via a shared broadcast channel. Prior to the delivering broad cast service the cell controller 18 designates a control channel in cell 22 for handling call requests at activation of the cell 22. The control channel is a standard voice channel that has been designated by the cell controller 18 as a control channel and is in a designated range of channels. Designating a control channel is part of the standard set up procedure when a cell is activated.

Once the cell has been activated, the method of the present invention begins at step 204 when the cell controller 18 receives a call request for informational audio service from a remote user, such as the remote user 26, on the control channel. In response to the call request for informational audio service from remote user 26 on the control channel, the cell controller 18 checks the authorization for remote user 26 by retrieving the profile and authorization information for remote user 26 from the HLR 20 at step 208. Based on the information retrieved from the HLR 20, the cell controller 18 determines if remote user 26 is a valid user at step 210. If remoter user 26 is not a valid user, the method follows the "no" branch from step 210 to step 216 where the remote user 26 is disconnected, and no informational audio service is provided to remote user 26. On the other hand if, at step 210, the cell controller 18 determines that remote user 26 is a valid user, the method follows the "yes" branch to step 212.

At step 212, the cell controller 18 determines if a broadcast channel for the particular requested broadcast information service is already active and connected to any remote user in the cell 22. If the broadcast channel is already active for the requested broadcast information service, the method follows the "yes"branch from step 212 to step 218, and the remote user 26 is connected to the broadcast channel for the reception of the requested informational audio service from the broadcaster 11. The connection of the remote user 26 to the active broadcast channel is accomplished by the cell controller 18 instructing the remote user 26, via the control channel, to retune to the active broadcast channel.

If, at step 212, the cell controller 18 determines that a broadcast channel for the requested broadcast information service is not already active and connected to a remote user, the method follows the "no" branch from step 212 to step 214 where the cell controller 18 designates a voice channel as a broadcast channel. The method then proceeds to step 220, and the cell controller 18 disables monitoring the return signal for quality control of the broadcast channel. In order to use a voice channel as a broadcast channel, the cell controller 18 must ignore the return signals for quality control purposes because multiple return signals from multiple remote users will normally be interpreted as a quality defect in the voice channel. Quality control based on the return signals is deactivated on the broadcast channel by assigning control channel characteristics to the broadcast channel or by assigning diagnostic settings to the broadcast channel. Once the broadcast channel has been designated (step 214) and conditioned to ignore return signal quality (step 220), the cell controller 18 activates the broadcast channel at step 222. Once the broadcast channel is activated at step 222, the method then proceeds to step 218 where the remote user 26 is connected to the broadcast channel by retuning to the broadcast channel in response to instructions, via the control channel, from the cell controller 18.

When a second remote user 28 subsequently requests the same broadcast information, the second remote user 28, after validation at step 210, is connect to and shares the broadcast channel with remote user 26.

Turning to FIG. 3, there is shown a method in accordance with the present invention for delivering broadcast information when a broadcaster 11, via the public switched telephone network 12, initiates a call request to broadcast data to a number of identified remote users such as billboards 30 and 32. The method begins at step 300 with a call request to the mobile switch 14 for broadcast service from the broadcaster 11.

In response to the call request at step 300, the cell controller 18 checks the HLR 20 at step 302 to determine whether the broadcaster 11 is authorized to broadcast to the identified remote users of the cellular communications system 10. If the broadcaster is not authorized, the method follows the "no" branch from step 302 to step 314 where the broadcaster's connection to the mobile switch 14 is disconnected. If the broadcaster 11 is authorized to broadcast to the identified remote users of the cellular communications system 10 at step 302, the method follows the "yes" branch to step 304.

At step 304, the cell controller 18 identifies the remote users, such as billboards 30 and 32, that are to receive broadcast information from broadcaster 11. The remote users are identified based on information in the HLR 20. The information in the HLR 20 was supplied at the time the broadcaster 11 signed up to provide the broadcast service. At step 306, the cell controller 18 designates a broadcast channel in cell 22 for broadcasting data from broadcaster 11 to remote users, such as billboards 30 and 32. In order to use a voice channel as a broadcast channel, the cell controller 18 again must ignore the return signal for quality control purposes because of the multiple return signals from remote users 26 and 28. At step 308, quality control is deactivated on the broadcast channel by assigning control channel characteristics to the broadcast channel or by assigning diagnostic settings to the broadcast channel. Once the broadcast channel has been set up at steps 306 and 308, the method proceeds to step 310.

At step 310, the cell controller 18 activates the broadcast channel. Once the broadcast channel is activated at step 310, the method then proceeds to step 312 where the remote users 30 and 32 are simultaneously connected to the broadcast channel by tuning to the broadcast channel in response to instructions, via the control channel, from the cell controller 18.

Based on the foregoing, the present invention provides a system and method for delivering broadcast information services to a number of remote users over a shared broadcast channel. By sharing a broadcast channel, the limited number of channels in a cell can be conserved, and the cellular communications system's usage can be expanded.

What is claimed is:

1. In a cellular communications system having a mobile switch, remote users, cells, and a limited number of channels per cell, a method for transmitting data to remote users on shared channels comprising:

a. receiving a request for broadcast service from a first remote user;
   b. designating a voice channel as a broadcast channel in a cell for broadcast service;
   c. activating the designated broadcast channel;
   d. connecting the first remote user to the designated broadcast channel; and
   e. disabling quality monitoring of a return signal from the first remote user for the designated broadcast channel.

2. The method of claim 1, wherein disabling quality monitoring of the return signal is accomplished by assigning diagnostic settings to the designated broadcast channel.

3. The method of claim 1, wherein disabling quality monitoring of the return signal is accomplished by assigning control channel characteristics to the designated broadcast channel.

4. The method of claim 1, wherein the method further includes receiving a request for service from a second remote user and connecting the second remote user to the designated broadcast channel at the same time as the first remote user.

5. In a cellular communications system having a mobile switch, remote users, cells, and a limited number of channels per cell, a method for transmitting data to remote users on shared channels comprising:

a. receiving a request for service from a broadcaster;
   b. designating a voice channel as a broadcast channel in a cell for broadcast service;
   c. activating the designated broadcast channel;
   d. connecting a number of remote users to the designated broadcast channel; and
   e. disabling quality monitoring of a return signal from each of the remote users for the designated broadcast channel.

6. The method of claim 5, wherein disabling quality monitoring of the return signal is accomplished by assigning diagnostic settings to the designated broadcast channel.

7. The method of claim 5, wherein disabling quality monitoring of the return signal is accomplished by assigning control channel characteristics to the designated broadcast channel.

8. A cellular communications system having a mobile switch, remote users, cells, and a limited number of channels per cell, wherein the mobile switch comprises:

a. a cell controller operatively connected to the cell for controlling access to the channels in the cell, wherein the cell controller is configured to:
      i. receive a request for broadcast service from a first remote user;
      ii. designate a voice channel as a broadcast channel in a cell for broadcast service;
      iii. activate the designated broadcast channel;
      iv. connect the first remote user to the designated broadcast channel; and
      v. disable quality monitoring of a return signal from the first remote user for the designated broadcast channel.

9. The cellular communications system of claim 8, wherein the cell controller disables quality monitoring of the return signal by assigning diagnostic settings to the designated broadcast channel.

10. The cellular communications system of claim 8, wherein the cell controller disables quality monitoring of the return signal by assigning control channel characteristics to the designated broadcast channel.

11. The cellular communications system of claim 8, wherein the cell controller, in response to receiving a request for service from a second remote user, connects the second remote user to the designated broadcast channel at the same time as the first remote user.

12. A cellular communications system having a mobile switch, remote users, cells, and a limited number of channels per cell, wherein the mobile switch comprises:

a. a cell controller operatively connected to the cell for controlling access to the channels in the cell, wherein the cell controller is configured to:
      i. receive a request for service from a broadcaster;
      ii. designate a voice channel as a broadcast channel in a cell for broadcast service;

iii. activate the designated broadcast channel;
iv. connect a number of remote users to the designated broadcast channel; and
v. disable quality monitoring of a return signal from each of the remote users for the designated broadcast channel.

13. The cellular communications system of claim 12, wherein the cell controller disables quality monitoring of the return signal by assigning diagnostic settings to the designated broadcast channel.

14. The cellular communications system of claim 12, wherein the cell controller disables quality monitoring of the return signal by assigning control channel characteristics to the designated broadcast channel.

* * * * *